(12) United States Patent
Razafimahefa et al.

(10) Patent No.: US 7,971,206 B2
(45) Date of Patent: Jun. 28, 2011

(54) PROTOCOL FOR MESSAGE DELIVERY AMONG INDEPENDENTLY EVOLVING PROCESSES

(75) Inventors: Chrislain Razafimahefa, Geneva (CH); Krzysztof Palacz, San Francisco, CA (US); Grzegorz Jan Czajkowski, Menlo Park, CA (US); Laurent Philippe Daynes, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 1126 days.

(21) Appl. No.: 11/729,609

(22) Filed: Mar. 28, 2007

(65) Prior Publication Data

US 2008/0238616 A1    Oct. 2, 2008

(51) Int. Cl.
*G06F 15/163* (2006.01)
(52) U.S. Cl. .................................. 719/313; 719/314
(58) Field of Classification Search .................. 719/313
See application file for complete search history.

(56) References Cited

U.S. PATENT DOCUMENTS

2006/0123156 A1 * 6/2006 Moir et al. .................. 710/33

OTHER PUBLICATIONS

Roblee, C.; Berk, V; Cybernko, G.; "Implementing Large-Scale Autonomic Server Monitoring Using Process Query Systems," Proceedings of the 2nd Internation Conference on Autonomic Computing (Jun. 13-16, 2005), pp. 123-133 [retrieved from http://ieeexplore.ieee.org on Sep. 7, 2010].*
Goodheart, B.; Cox, J.; The Magic Garden Explained: The Internals of UNIX System V Release 4, An Open Design, Prentice Hall of Australia Pty Ltd. (1994), pp. 141-192, 209-279, and 528-559.*
Lomet, D.B., "Process Structuring, Synchronization, and Recovery Using Atomic Actions," ACM SIGPLAN Notices, vol. 12, Issue 3 (Mar. 1977), p. 128-137 [retrieved from http://portal.acm.org/citation.cfm?id=808319 on Aug. 23, 2010].*

* cited by examiner

*Primary Examiner* — Hyung S Sough
*Assistant Examiner* — Brian Wathen
(74) *Attorney, Agent, or Firm* — Osha • Liang LLP

(57) ABSTRACT

The present invention relates to a method for message delivery from a sender process to a receiver process within a computer system, comprising performing an atomic check for the receiver process and a parent of the receiver process, returning a first status of the receiver process and a second status of the parent of the receiver process based on the atomic check, and delivering the message according to the first status and the second status, wherein the first status and the second status stay unchanged during the atomic check.

20 Claims, 7 Drawing Sheets

PROTOCOL FOR MESSAGE DELIVERY AMONG INDEPENDENTLY EVOLVING PROCESSES

BACKGROUND

In computing, a process is a running instance of a program, including all variables and state information. A modern computer operating system typically supports many processes, which are multitasked to give the appearance that the process can run simultaneously. Processes are often called tasks. Processes may execute on one or more computers connected by a network. The operating system identifies each process by its process identifier (PID). Once a process is created, its PID may be transmitted to other processes.

A parent process is a process that has created one or more child processes. A child process is a process created by another process (i.e., the parent process). For example, in UNIX, a process may be created when another process executes the fork system call. In such an example, the process that invoked the fork system call is the parent process and the newly-created process is the child process. Every process (except, for example, process 0 in UNIX) has only one parent process, but may have many child processes.

In a multitasking computer system, processes may occupy a variety of states. These distinct states may not actually be recognized as such by the operating system, however they are a useful abstraction for the understanding of processes. Described below are typical process states that are possible on computer systems of all kinds.

When a process is first created, it occupies the "created" or "new" state. In this state, the process awaits admission to the "waiting" or "ready" state. A "waiting" process denotes a process that has been loaded into main memory and is awaiting execution on a CPU. For example, in a one processor system, only one process can be executing at any one time, and all other "concurrently executing" processes will be waiting for execution.

A "running," "executing," or "active" process denotes a process which is currently executing on a CPU. From this state, the process may exceed its allocated time slice and be context switched out and back to a "waiting" state by the operating system, it may indicate that it has finished and be terminated, or it may block on some needed resource (such as an input/output resource) and be moved to a "sleeping" or "blocked" state. The process will remain "sleeping" until its resource becomes available. Once the operating system is aware that a process is no longer blocking, the process is again "ready" and can from there be dispatched to its "running" state. At this point, the process may make use of its newly available resource.

A process may be terminated, either from the "running" state by completing its execution or by explicitly being killed. In either of these cases, the process moves to the "terminated" or "dead" state. A process in the "created" or "terminated" state may not be present in the main memory of the computer system.

Message passing or any sort of delivery of a message, is a form of communication used in various sorts of programming methods, including concurrent programming, parallel programming, object-oriented programming, interprocess communication, and other application that requires communication. Communication is performed by the sending of messages to recipients. Forms of messages may include function invocation, signals, data packets, and the like. Messages may be delivered from a sender process to a receiver process by first obtaining the PID of the receiver process. The receiver process may not be able to receive the message if the process is not present in the main memory, e.g., if the receiving process is not yet started by its parent or if the receiving process is terminated already. The sender process may be waiting in a loop for the receiver process to be able to receive message or acknowledge the receipt of the message. A common technique known in the art is to implement a message buffer to allow the sender process to continue executing without waiting for the receiver process. If an error condition eventually occurs, the message may then be handled without wasting processing cycles in a wait loop.

SUMMARY

In general, in one aspect, the present invention relates to a method for message delivery from a sender process to a receiver process within a computer system, comprising performing an atomic check for the receiver process and a parent of the receiver process, returning a first status of the receiver process and a second status of the parent of the receiver process based on the atomic check, and delivering the message according to the first status and the second status, wherein the first status and the second status stay unchanged during the atomic check.

In general, in one aspect, the present invention relates to a computer readable medium, embodying instructions executable by the computer to perform method steps for message delivery from a sender process to a receiver process within a computer system, the instructions comprising functionality to perform an atomic check for the receiver process and a parent of the receiver process, to return a first status of the receiver process and a second status of the parent of the receiver process based on the atomic check, and to deliver the message according to the first status and the second status, wherein the first status and the second status stay unchanged during the atomic check.

In general, in one aspect, the present invention relates to a computer system comprising a memory comprising a set of instructions, and a processor operatively coupled to the memory, wherein the processor executes the set of instructions to perform an atomic check for a receiver process and a parent of the receiver process, to return a first status of the receiver process and a second status of the parent of the receiver process based on the atomic check, and to deliver a message according to the first status and the second status, wherein the first status and the second status stay unchanged during the atomic check.

Other aspects and advantages of the invention will be apparent from the following description and the appended claims.

DETAILED DESCRIPTION

Figure 1:
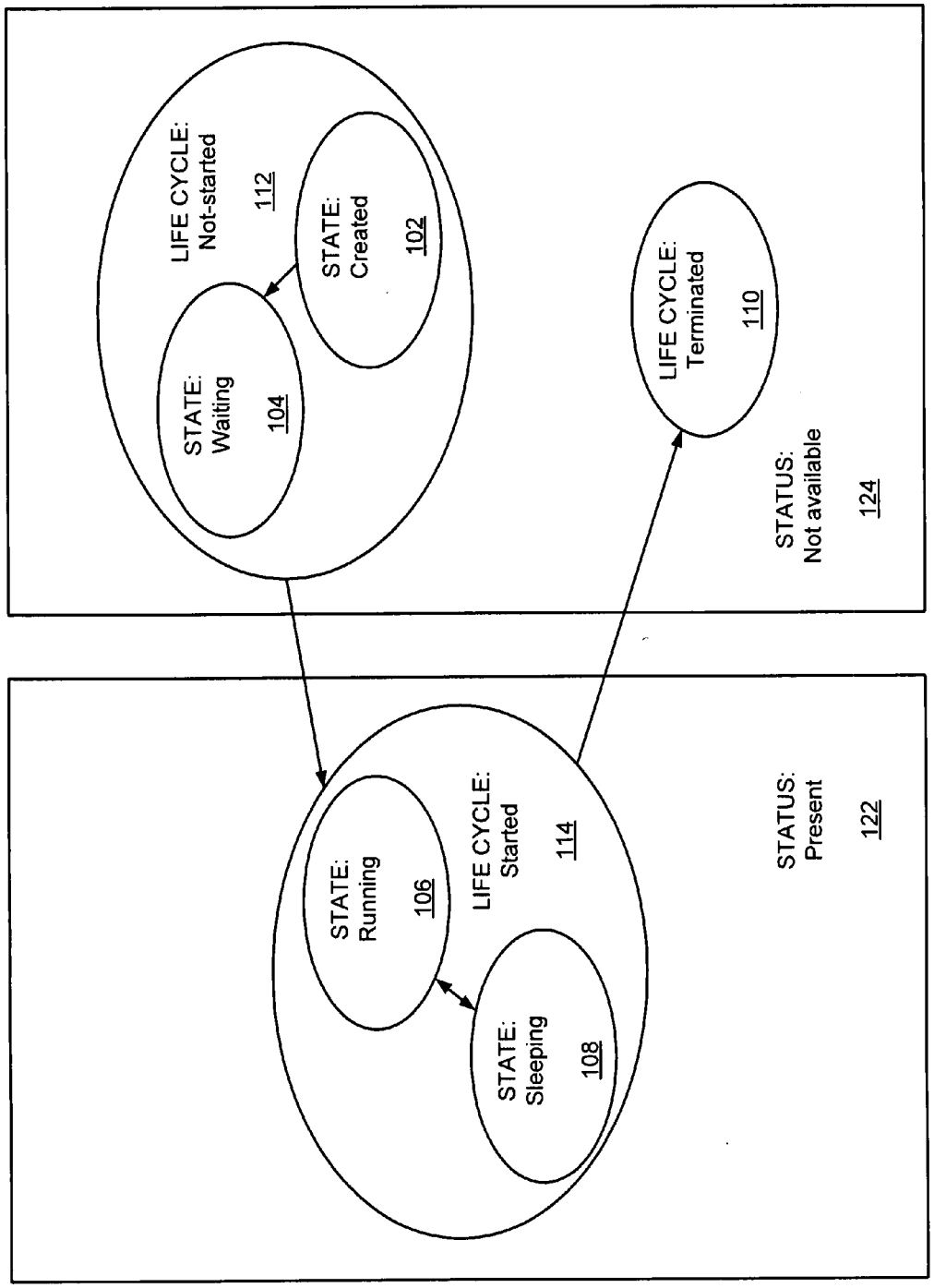
FIG. 1 shows a schematic diagram in accordance with one or more embodiments of the present invention.

Specific embodiments of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, in one aspect, the invention relates to a protocol that ensures a message being transmitted to a receiver process, which can be in any state except the "terminated" state, without the complexity of using message buffers.

FIG. 1 shows a schematic diagram of process status, life cycle, and state in accordance with one or more embodiments of the present invention. As shown in FIG. 1, a status of a process may be "present" (122) or "not available" (124). The process that is present may be in a life cycle "started" (114). The process in life cycle "started" may include the process states "running" (106) and "sleeping" (108). The process that is not available may be in the life cycle "not-started" (112) or "terminated" (110). The process in the life cycle "not-started" may include the process state "created" (102), "waiting" (104), or may not have been created and therefore does not possess a process state.

Figure 2:
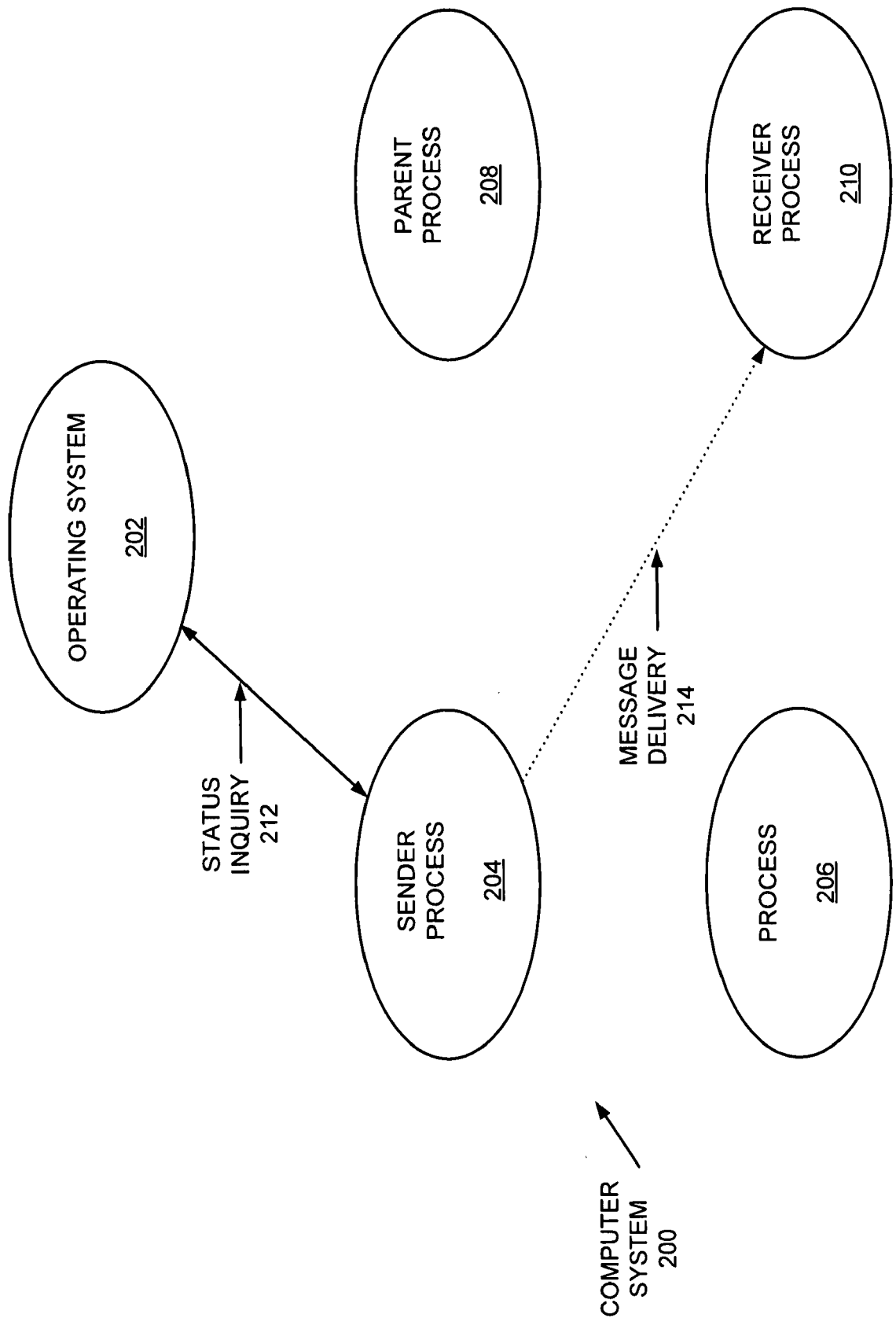
FIG. 2 shows a sender process inquiring status in accordance with one or more embodiments of the present invention.

FIG. 2 shows a sender process inquiring about status of a receiver process and a parent of the receiver process in accordance with one or more embodiments of the present invention. As shown in FIG. 2, a computer system (200) includes an operating system (202) and multiple processes (such as a sender process (204), a process (206), a receiver process (210), and a parent process (208)) of the receiver process (210). Here, the sender process (204) obtains a PID (not shown) of the receiver process (210). For example, the PID may be obtained from another process such as the process (206).

In one or more embodiments of the invention, the sender process may include functionality to deliver a message to the receiver process (210) using the PID (not shown). The sender process (204) may obtain the PID of the parent process (208) from the operating system (202) using the PID (not shown) of the receiver process (210). The sender process (204) may then inquire the status of the parent process (208) and the receiver process (210) using the PIDs (not shown) of both processes. The operating system (202) may return the inquired status to the sender process (204) with the inquiry transaction shown as the arrow (212).

In one or more embodiments of the invention, if the returned status indicates that the receiver process status is "present," then the sender process (204) may proceed with the message delivery (214). Although FIG. 1 shows only a few processes in the computer system (200), in other examples the computer system (200) may include many more processes in various different states.

Figure 3:
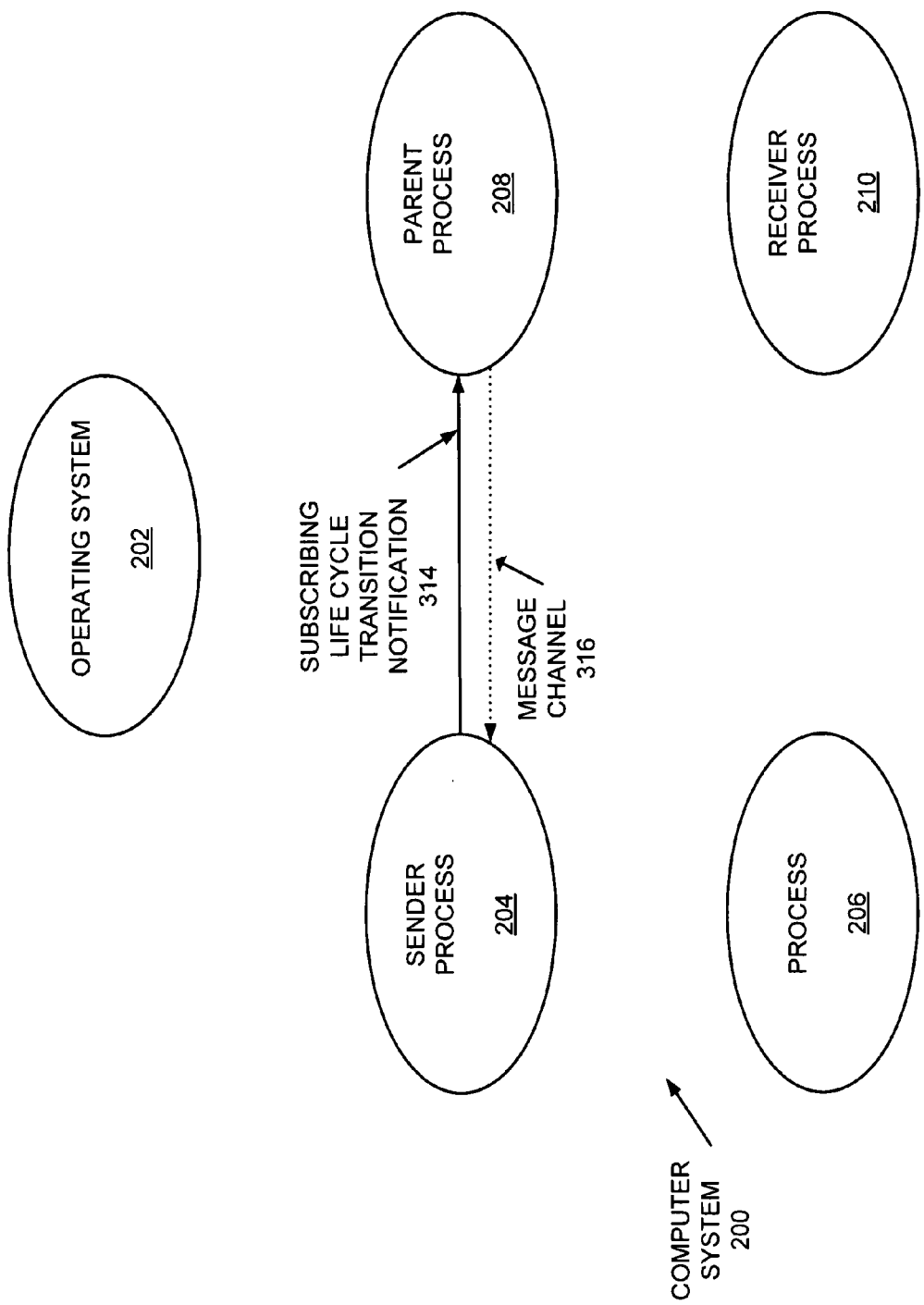
FIG. 3 shows the sender process subscribing to a lifecycle of the receiver process in accordance with one or more embodiments of the present invention.

FIG. 3 shows the sender process subscribing to a lifecycle of the receiver process by sending a message to the parent of the receiver process in accordance with one or more embodiments of the present invention. Here, the computer system (200), the operating system (202), the sender process (204), the process (206), the receiver process (210), and the parent process (208) of the receiver process (210) are essentially the same as shown in FIG. 2.

In one or more embodiments of the invention, the sender process may include functionality to deliver a message to the receiver process (210). The sender process (204) may inquire about the status of the parent process (208) and the receiver process (210) from the operating system (202), as described in reference to FIG. 2. If the returned status indicates that both the parent process (208) and the receiver process (210) have the status "not available," the sender process (210) may then cancel the message delivery as both processes might have terminated subsequent to the sender process (204) obtaining the PID (not shown) of either process. In one or more embodiments of the invention, if the returned status from the operating system (202) indicates that the parent process (208) has status "present" and the receiver process (210) has status "not available," then the sender process (204) may subscribe to be informed of the life cycle transition of the receiver process (210) from the parent process (208).

For example, this subscription functionality may be implemented as part of an atomic check along with the status inquiry transaction (212) described in reference to FIG. 2. The life cycle transitions of the parent process (208) and the receiver process (210) are halted during the atomic check so as to eliminate the asynchronous issues described below. Many asynchronous situations may lead to incorrect interpretation of state check if the states of the receiver process (210) and the parent process (208) are allowed to evolve during the state check. For example, a state check may first check the receiver process (210) and indicate that the receiver process (210) is not started and then check the parent process (208) and indicate that the parent process (208) is also not started while the parent process may have started the receiver process (210) as well as gone into the "terminated" state in between the two steps of the state check. One skilled in the art will appreciate that there are many other examples of the asynchronous situation where incorrect interpretations may occur. Therefore, the state check cannot indicate a definite result if the state check is not done atomically.

The atomic check functionality may be supported by the operating system (202). In one or more embodiments of the invention, the subscription of the life cycle may be implemented as a special message (314) that may be sent to the parent process (208) from the sender process (204) as part of the atomic check. Further, in one or more embodiments of the invention, the operating system (202) may inform the parent process (208) when the receiver process (210) is started. The parent process (208) may then notify the sender process (204) about the event of the receiver process (210) starting. In another example, the sender process (204) may obtain from the parent process, as part of the atomic check, (208) a message channel (316) over which the life cycle transitions of the receiver process (210) may be monitored. In some examples, the sender process may go into the "sleeping" state waiting to be waked up upon the receiver process (210) being started. The parent process (208) may request the operating system (202) to wake up all processes waiting for the receiver process (210) to start.

Figure 4:
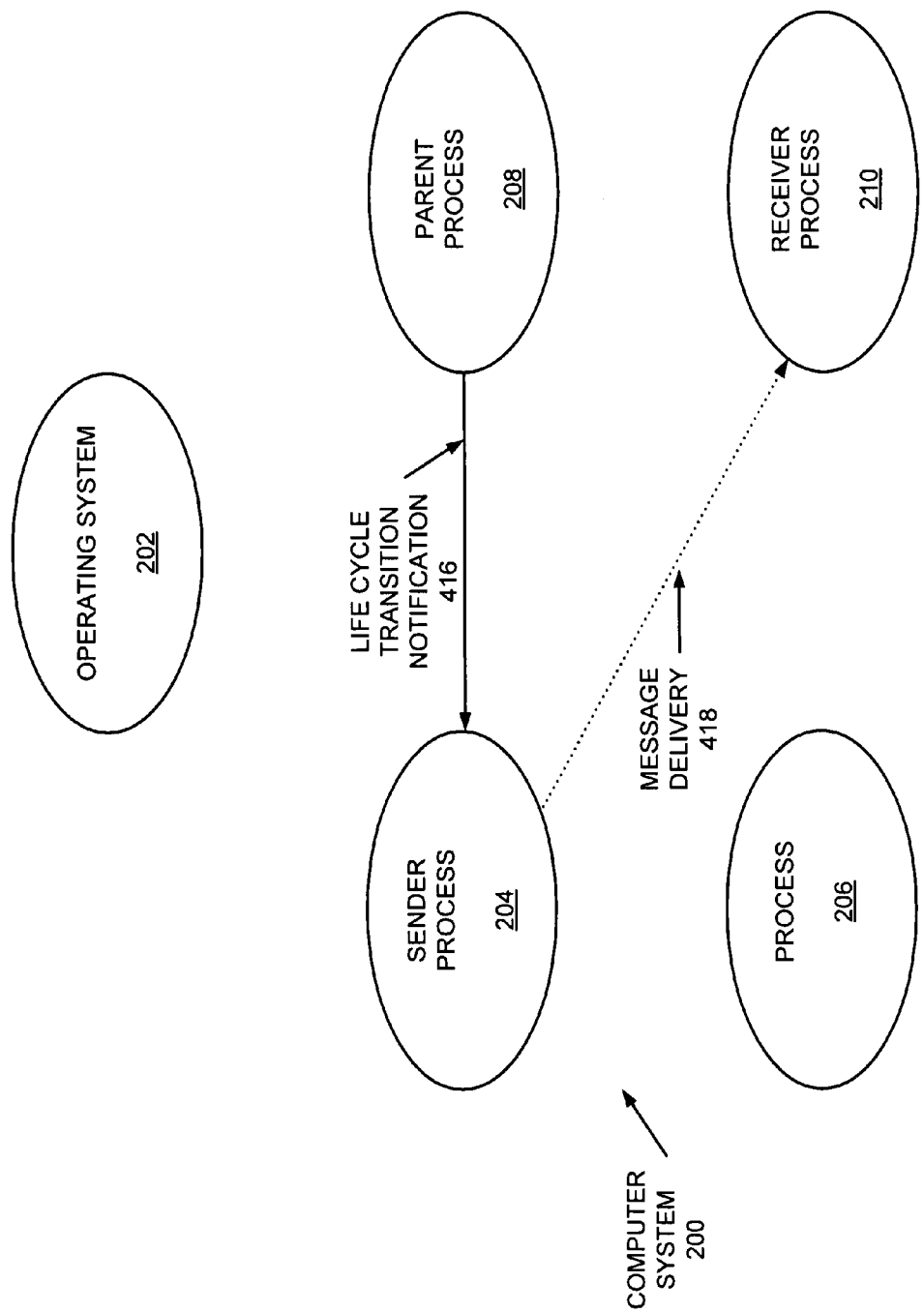
FIG. 4 shows a sender process sending a message in accordance with one or more embodiments of the present invention.

FIG. 4 shows the sender process sending a message to the receiver process in accordance with one or more embodiments of the present invention. Here, the computer system (200), the operating system (202), the sender process (204), the process (206), the receiver process (210), and the parent process (208) of the receiver process (210) are essentially the same as shown in FIG. 3.

In one or more embodiments of the invention, the sender process (204) may include functionality to deliver a message to the receiver process (210). For example, the sender process (204) may subscribe to be informed of the life cycle transitions of the receiver process (210) from the parent process (208) as described in reference to FIG. 3. For example, the parent process (208) may notify, as shown here as the arrow (416), the sender process (204) upon the receiver process (210) being started. In another example, the sender process (204) may receive the notification (416) through the message channel (316) as shown in FIG. 3. In some examples, the sender process may be woken up by the notification (416). Accordingly, the sender process 204 may then proceed with the message delivery (418).

Together FIGS. 2 and 4 illustrate a protocol that provides a reliable status of the receiver process (210) without incorrect interpretation caused by the asynchronous situations described above. More specifically, the sender process (204) may query the lifecycle transitions of both the receiver process (210) and the parent (210) of the receiver process (210) atomically, i.e., while the presence of both processes is being checked, their respective states do not evolve. Once the status of the receiver process (210) is obtained reliably, the sender process (204) may proceed with message delivery. Typical process lifetime is sufficient for the receiver process (210) to receive the message delivery. An extremely short-lived process may terminate before the message can be received. In one example, an error message may be generated for the sender process (204). In another example, the message may be lost without the sender process (204) being notified through the error message, in which case a higher level software may be needed to handle the message loss.

Figure 5:
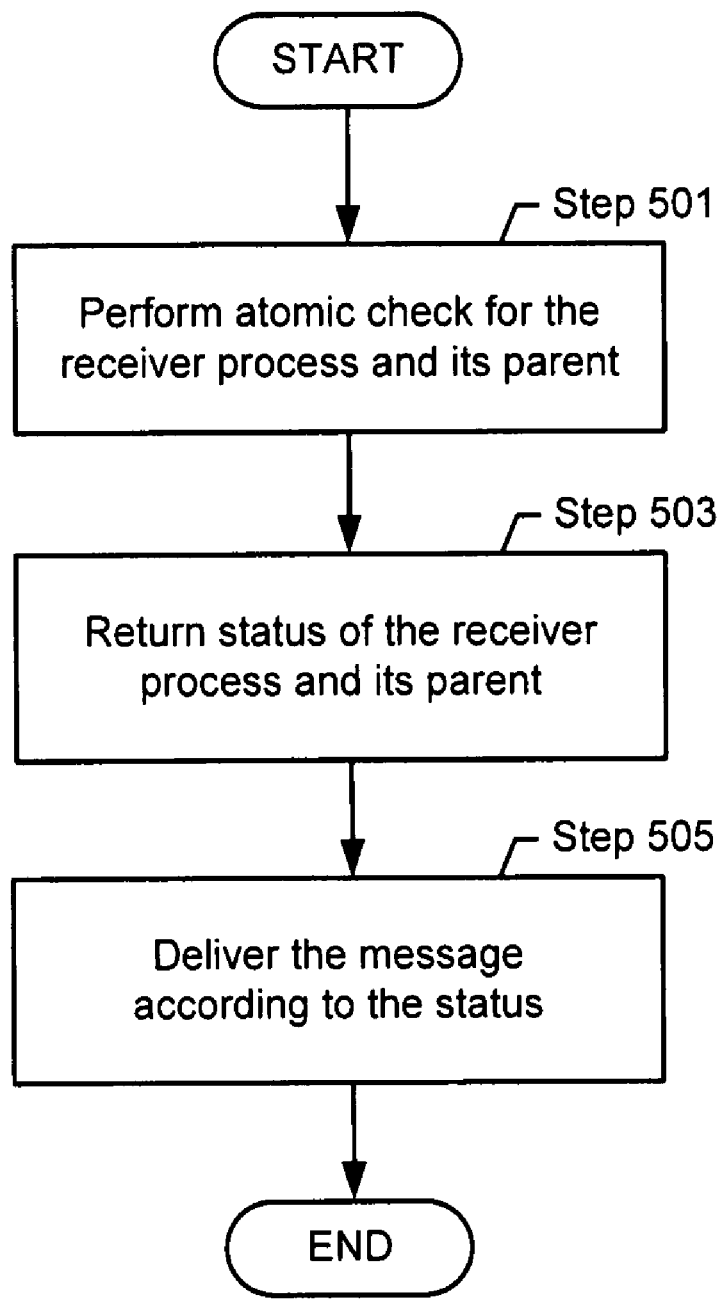
FIGS. 5 and 6 show flow charts of a method in accordance with one or more embodiments of the present invention.
Figure 6:
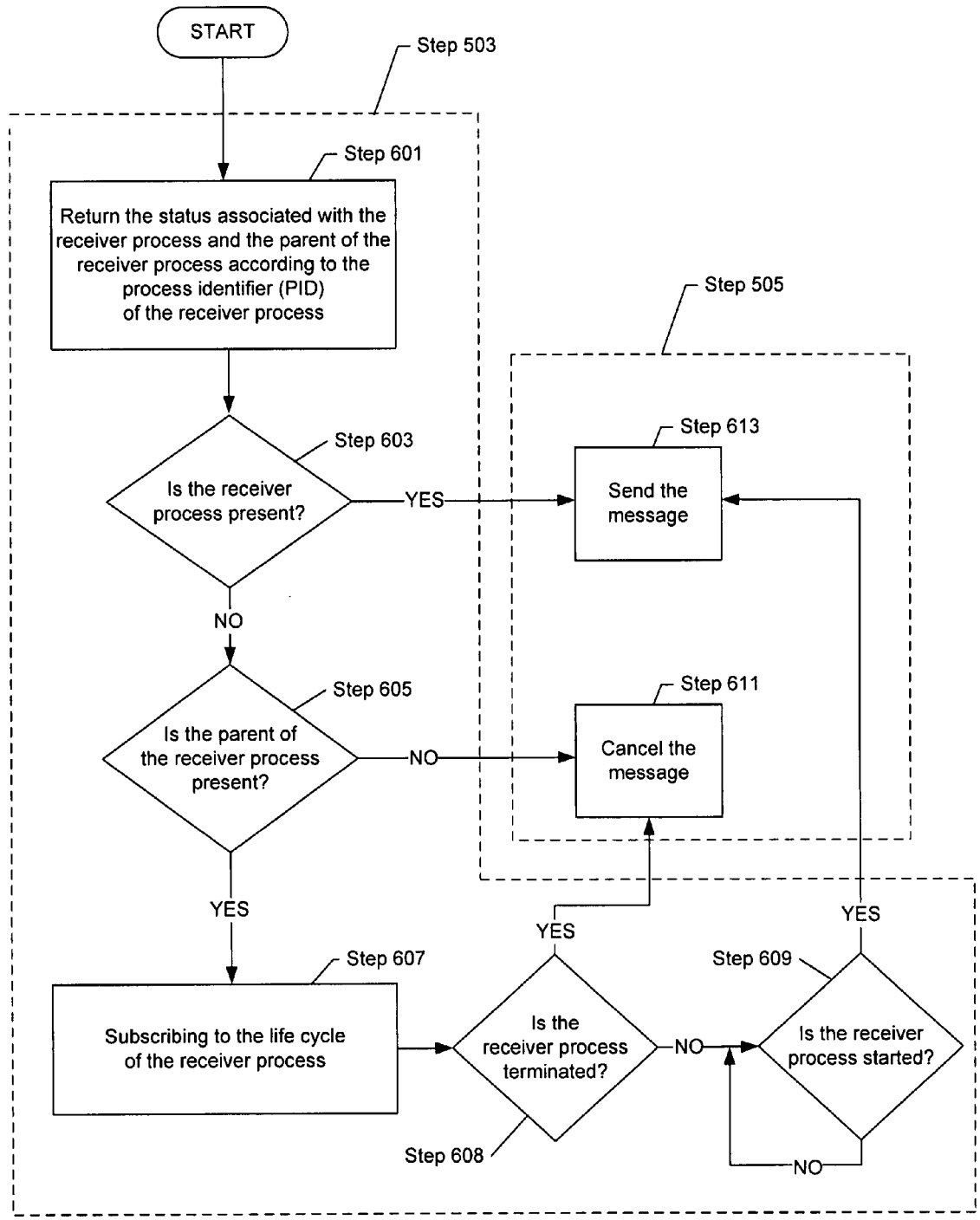

FIGS. 5 and 6 show flow charts of a method for lossless message delivery in accordance with an embodiment of the present invention. In FIG. 5, initially, a sender process may perform an atomic check for the receiver process and a parent of the receiver process (Step 501). The atomic check may be performed using the PID of the receiver process from an operating system that manages the processes. The atomic check may return the status of the receiver process and the parent of the receiver process (Step 503). According to the result of the atomic check, the sender process may deliver the message, go into a "sleeping" state waiting for the receiver process, or cancel the message delivery (Step 505). FIG. 6 shows more details of an example for these steps. Here, the operating system may return the status of the receiver process and the parent of the receiver process requested from the sender process (Step 601).

A decision is made in step 603 as to whether the receiver process is present. If present, the sender process may send the message (Step 613). If not present, another decision is made in Step 605 as to whether the parent process is present. If not present, the sender process may cancel the message deliver (Step 611). If present, the sender process may subscribe to the life cycle transition of the receiver process from the parent process, i.e., the sender process may obtain life cycle information of the receiver process (Step 607). For example, in Step 607, the operating system may request the parent process to notify the sender process upon the receiver process being started.

In one or more embodiments of the invention, Steps 601 and 607 may be implemented as an atomic check where the life cycle transitions of the parent process and the receiver process are halted by the operating system to eliminate the asynchronous issue described above. In one or more embodiments of the invention, Steps 601, 603, 605, and 607 may all be implemented as part of the atomic check. In these examples, the atomic check operation may return to the sender process an identity of a newly created message channel to listen for life cycle event of the receiver process, such as the life cycle transition to "started."

Continuing the discussion of FIG. 6, a decision is made in Step 608 as to whether the receiver process is terminated. For example, this information may be obtained through the life cycle subscription of the receiver process in Step 607. If terminated, the sender process may cancel the message delivery and the method proceeds to Step 611. If not terminated, the sender process then waits for the receiver process to be started (Step 609). In one or more embodiments of the invention, the sender process may go into a "sleeping state" in Step 609. Subsequently, the sender process may send the message upon the receiver process being started and the method proceeds to Step 613.

Figure 7:
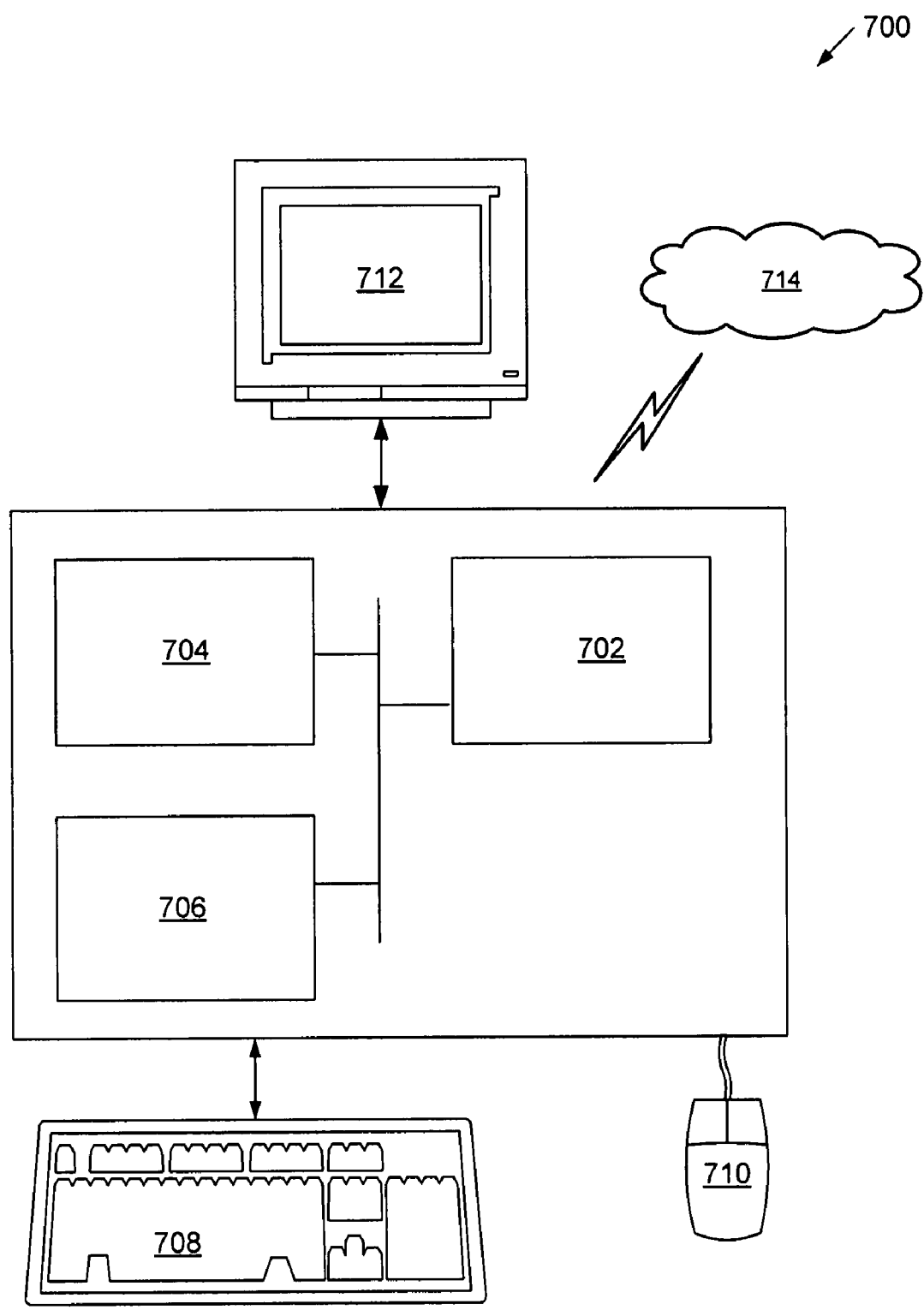
FIG. 7 shows a computer system in accordance with one or more embodiments of the present invention.

In accordance with one or more embodiments the invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a network (714) (e.g., a local area network (LAN), a wide area network (WAN) such as the Internet, any other type of network, or any combination thereof) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., sender process, receiver process, parent process, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Advantages of the present invention may include one or more of the following. A message delivery system may be implemented without the complexity of message buffers. A sender process may not waste processing cycles in a wait loop. An asynchronous problem associated with checking the status of a receiver process and a parent of the receiver process may be eliminated. Message loss due to incorrect interpretation of receiver process status may be eliminated.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for message delivery from a sender process to a receiver process within a computer system, comprising:
    performing, using an operating system of a computer system, an atomic check for the receiver process and a parent of the receiver process;

returning, using the operating system, a first status of the receiver process and a second status of the parent of the receiver process based on the atomic check;

determining, based on the first status, whether the receiver process is present;

monitoring a lifecycle of the receiver process when the parent process is present;

and delivering, from the sender process, the message when the determining or monitoring indicates that the message is deliverable, wherein the first status and the second status stay unchanged during the atomic check.

2. The method of claim 1, further comprising: obtaining a process identifier (PID) of the receiver process, wherein the atomic check is performed based on the PID.

3. The method of claim 1, wherein each of the first status and the second status is one selected from the list consisting of "present" and "not available," and wherein the message is delivered, when deliverable, without message buffering.

4. The method of claim 3, wherein delivering the message comprises sending the message when the first status is "present".

5. The method of claim 3, further comprising cancelling the message when both the first and second status are "not available".

6. The method of claim 1, wherein the lifecycle is one selected from a list consisting of "not-started," "started," and "terminated".

7. The method of claim 6, further comprising:

allowing the sender process to enter into a "sleeping" state; and waking up the sender process based on a change of the lifecycle of the receiver process.

8. The method of claim 6, further comprising:

requesting the parent of the receiver process to send a notice to the sender process based on a change of the lifecycle of the receiver process.

9. The method of claim 6, further comprising:

obtaining a message channel for monitoring the lifecycle of the receiver process.

10. The method of claim 6, wherein monitoring lifecycle of the receiver process is performed only if the first status is "not available" and the second status is "present".

11. The method of claim 6, wherein delivering the message comprises holding the message when the lifecycle is "not-started".

12. The method of claim 6, wherein delivering the message comprises sending the message when the lifecycle is "started".

13. The method of claim 6, wherein delivering the message comprises cancelling the message when the lifecycle is "terminated".

14. A non-transitory computer readable medium, embodying instructions executable by the computer to perform method steps for message delivery from a sender process to a receiver process within a computer system, the instructions comprising functionality to:

perform an atomic check for the receiver process and a parent of the receiver process;

return a first status of the receiver process and a second status of the parent of the receiver process based on the atomic check;

determine, based on the first status, whether the receiver process is present;

monitor a lifecycle of the receiver process when the parent process is present; and deliver, from the sender process, the message when the determining or monitoring functionality indicates that the message is deliverable, wherein the first status and the second status stay unchanged during the atomic check.

15. The computer readable medium of claim 14, wherein each of the first status and the second status is one selected from the list consisting of "present" and "not available,"

wherein delivering the message comprises sending the message when the first status is "present" and cancelling the message when both the first and second status are "not available," and wherein the message is delivered, when deliverable, without message buffering.

16. The computer readable medium of claim 15, wherein the lifecycle is one selected from a list consisting of "not-started," "started," and "terminated," and wherein delivering the message comprises holding the message when the lifecycle is "not-started," and sending the message when the life cycle is "started".

17. A computer system comprising:

an operating system;

a sender process and a receiver process in operative communication with the operating a memory comprising a set of instructions; and a processor operatively coupled to the memory, wherein the processor executes the set of instructions to:

perform, using the operating system, an atomic check for the receiver process and a parent of the receiver process;

return a first status of the receiver process and a second status of the parent of the receiver process based on the atomic check;

determine, based on the first status, whether the receiver process is present;

monitor a lifecycle of the receiver process when the parent process is present; and deliver, from the sender process, a message when the determining or monitoring functionality indicates that the message is deliverable, wherein the first status and the second status stay unchanged during the atomic check.

18. The computer system of claim 17, wherein each of the first status and the second status is one selected from the list consisting of "present" and "not available,"

wherein delivering the message comprises sending the message when the first status is "present" and cancelling the message when both the first and second status are "not available," and wherein the message is delivered, when deliverable, without message buffering.

19. The computer system of claim 18, wherein the processor further executes the set of instructions to:

monitor a lifecycle of the receiver process if the first status is "not available" and the second status is "present", wherein the lifecycle is one selected from a list consisting of "not-started," "started," and "terminated".

20. The computer system of claim 19, wherein delivering the message comprises holding the message when the lifecycle is "not-started," and sending the message when the life cycle is "started".

* * * * *